(No Model.)
J. SWEENEY.
REMOVABLE WICK TUBE FOR LAMP BURNERS.
No. 266,221. Patented Oct. 17, 1882.
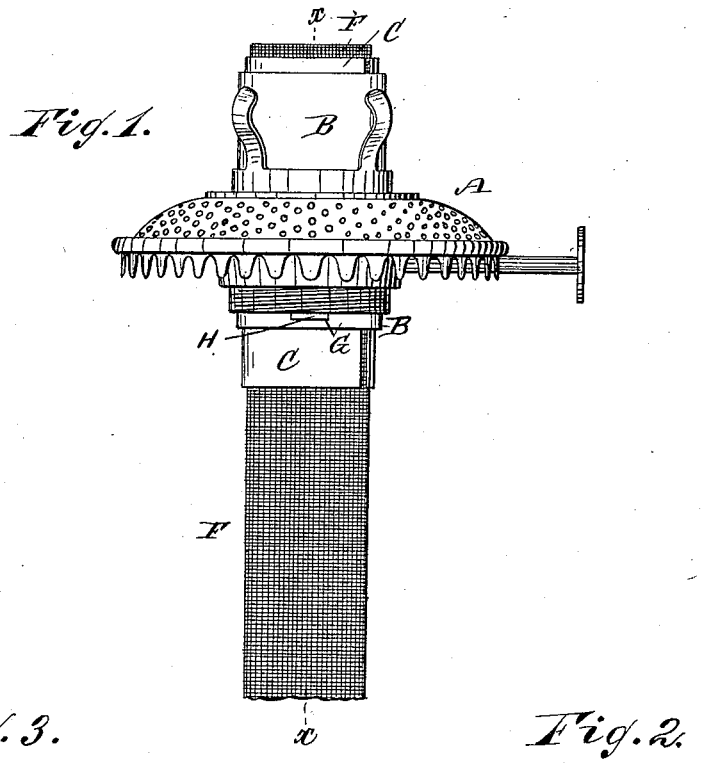
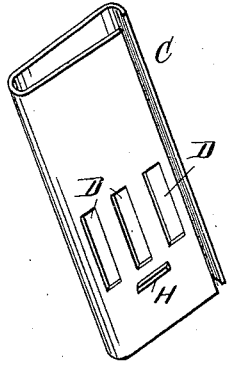
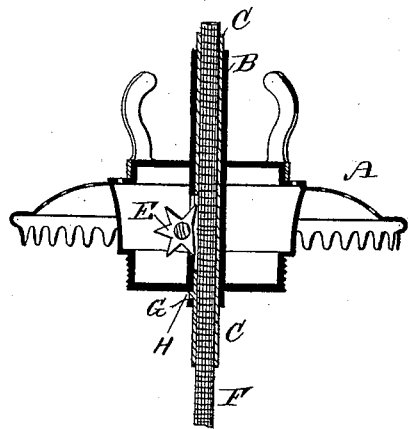
WITNESSES:
INVENTOR:
BY
ATTORNEYS.

UNITED STATES PATENT OFFICE.

JOHN SWEENEY, OF SING SING, ASSIGNOR TO HIMSELF AND ALFRED WALKER, OF NEW YORK, N. Y.

REMOVABLE WICK-TUBE FOR LAMP-BURNERS.

SPECIFICATION forming part of Letters Patent No. 266,221, dated October 17, 1882.

Application filed April 22, 1882. (No model.)

*To all whom it may concern:*

Be it known that I, JOHN SWEENEY, of Sing Sing, in the county of Westchester and State of New York, have invented a new and Improved Removable Wick-Tube for Lamp-Burners, of which the following is a full, clear, and exact description.

The object of my invention is to facilitate the insertion of a wick within the wick-tube of a lamp-burner.

The invention consists in a wick-tube cut open longitudinally to facilitate passing the wick into it, which wick-tube can be passed into a fixed tube of a lamp-burner, and can be locked in the same by means of a slot in this fixed tube and a stud or projection on the removable tube.

Reference is to be had to the accompanying drawings, forming part of this specification, in which similar letters of reference indicate corresponding parts in all the figures.

Figure 1 is a longitudinal elevation of a lamp-burner provided with my improved removable wick-tube. Fig. 2 is a cross-sectional elevation of the same on the line $x \cdot x$. Fig. 3 is a perspective view of my improved removable wick-tube.

The lamp-burner A, of the usual construction, is provided with a flat tube, B, adapted to receive the removable wick-tube C, which is made of spring-brass or other metal, and is made in the same manner as an ordinary wick-tube, but is cut open longitudinally at one edge, so that the flat sides of the tube can be pressed together or separated more or less. The wick-tube C is provided with a series of longitudinal slots, D, through which the ratchet-wheels E of the burner can pass into the wick F. The fixed tube B is provided with a recess or slot, G, in its lower end, and the removable wick-tube C is provided with a projection or stud, H, adapted to be passed into the recess or slot G for locking the removable wick-tube C in place in the fixed tube B. When in place in the burner the ends of the removable wick-tube C are to project from the ends of the fixed tube B.

The operation is as follows: The sides of the tube C are drawn apart sufficiently to enable a wick to be passed conveniently into the wick-tube through the longitudinal cut or slot in this tube. The sides of the wick-tube C are then pressed together sufficiently to permit passing the end of the removable tube C into the lower end of the tube B. Then the removable tube C is pushed into the tube B until the stud or projection H is snapped into the recess or slot G, as shown in Fig. 2, by the spring-power of the wick-tube C, thereby locking the removable tube C in the fixed tube B. A wick can thus be secured in the burner very easily and rapidly.

If the upper end of the wick-tube C is destroyed by heat, a new wick-tube C can be passed into the same burner, and the entire burner is not made worthless by the destruction of the upper edge of the wick-tube, as is the case in burners provided with fixed wick-tubes.

Having thus described my invention, what I claim as new, and desire to secure by Letters Patent, is—

1. A removable wick-tube adapted to be locked in a burner and to have its wick independently adjustable therein, substantially as herein shown and described.

2. The combination, with a burner, of a removable wick-tube cut open or split longitudinally, substantially as herein shown and described, and for the purpose set forth.

3. The combination, with the lamp-burner A and the fixed tube B thereof, provided with a recess or slot, G, of the removable wick-tube C, provided with a stud or projection H, substantially as herein shown and described, and for the purpose set forth.

JOHN SWEENEY.

Witnesses:
LEWIS W. MEAD,
JOHN NIXON.